Patented June 30, 1953

2,643,980

UNITED STATES PATENT OFFICE 2,643,980

PREPARATION OF A MULTILAYER CATALYST

Eugene J. Houdry, Ardmore, Pa.

No Drawing. Application September 23, 1950, Serial No. 186,503

9 Claims. (Cl. 252—455)

This invention relates to catalysts and to processes for catalyst manufacture, especially the production of solid catalysts of high activity and in gel form whether used as straight gel or incorporated on and/or in the pores of suitable supports or carriers. While the technique herein disclosed has general application to all processes for making solid catalysts in gel form for promoting any known or desired catalytic reaction, the technique is particularly concerned with the manufacture of catalysts starting with a liquid or liquids containing in solution the main constituent or constituents of the catalyst.

It is well known and clearly set forth in the literature of catalysis that catalysts can be prepared from liquid salt solutions by decomposing the salts by heat. Catalysts so obtained have been used commercially and have been satisfactory for certain operations. It is known however that solid catalysts produced by heat decomposition do not possess the high activity that they could have if the solid catalysts had been obtained by gelling through chemical reaction. Impregnation of porous support with nickel nitrate, aluminum nitrate, cobalt nitrate, etc., followed by decomposition of the salts by heat has been widely publicized. It has been found, however, that in all such cases the solid catalysts so obtained do not adhere firmly to the supports.

The literature also teaches that the quantity of active material on a support or carrier can be built up or increased by successive impregnations in the liquid solution, each impregnation being followed by decomposition by heat or by gelling. I have found in so building up the catalyst that the previously formed catalyst loses part of its activity when impregnated again with the solution. Such loss of activity, which becomes progressively more pronounced with each successive impregnation may be due to adsorption by the more active particles of the preformed catalyst.

A principal object of the present invention is to devise improved ways for obtaining solid catalysts of desired density or quantity from liquid solutions. Another object is to build up the density or the quantity of solid catalyst by successive impregnations with little, if any, adverse effect upon the activity of the catalyst. Still another object is to protect a preformed catalyst from loss of activity when dipped or otherwise contacted with a liquid solution of catalytic material. Still another object is to deposit solid highly active catalytic material in porous supports or carriers by means of liquid solutions of such material and by a succession of dippings or impregnations. Still other objects and advantages will be apparent from the detailed description which follows.

In order to avoid impairment or diminution of the activity of a preformed gel catalyst by a subsequent impregnation with a liquid solution of catalytic material it is necessary to provide protection for the highly adsorptive portion of the catalyst already formed. This can be accomplished by surrounding or covering the adsorptive portion of the catalyst with any suitable substance, as with a film of material which cannot be displaced or penetrated by the liquid solution of catalytic material. When the protecting substance is a liquid it must be immiscible with the liquid solution of catalytic material. I have found that in most instances hydrocarbons are suitable for such protection, especially heavy hydrocarbons in the lube oil range, also light unsaturated hydrocarbons, including refinery gases, which will polymerize and form a polymer film on the catalyst, also hydrocarbon coke which may be deposited on the catalyst as a by-product of cracking. By such means each deposit of gel or catalyst from an impregnation can be isolated or protected from penetration and impairment by the next impregnation. All protective hydrocarbon films, polymers or coke can be removed at one time by oxidation and burning in a regenerating operation prior to putting the catalyst or catalytic mass to use.

Solid catalysts which are soft or subject to disintegration need to be supported and protected against attrition, especially when they are to be utilized in moving bed operations. Any suitable supports or carriers can be employed but porous supports are most desirable. By using liquid solutions as the starting materials for the solid catalysts, carriers or supports having very small and even very minute physical pores may be employed. By preference the pores should be intercommunicating or interconnected so that when the solutions are gelled within the supports or carriers the catalyst will be in the form of a web extending all through the interior of the support or carrier so that removal or displacement of the catalytic material is virtually impossible by physical means. Supports or carriers which are eminently suitable for solid catalysts made according to the present invention are disclosed and claimed in my copending application Ser. No. 179,428 filed August 15, 1950 and are formed in small pieces of porcelaneous material fired at sufficiently high temperature to render them rigid, stable, inert catalytically and chemically, highly resistant to thermal shocks, and provided with a multiplicity of minute physical pores in the size range of .001" to .015". For maximum strength and resistance to attrition, as for use in moving bed operations, the pore size is kept as small as possible, as from microscopic to the range of .001" to .006" and preferably of the order of microscopic to .001". Protection of the several increments of catalysts deposited within the pores of the supports or carriers can be effected in the same manner and by the same means set forth in the preceding paragraph.

In order to illustrate the features and advantages of the present invention, a series of examples will now be given relating to the catalysis of hydrocarbons, specifically conversion or cracking. By experimentation it was found to be possible to obtain a stable liquid solution of aluminum and silicon in all proportions by mixing or dissolving an aluminum nitrate solution in ethyl orthosilicate with a proper amount of ethyl alcohol, or of an acid such as nitric acid. A clear stable liquid can thus be obtained which will not gel for several days. However, if the solution is slowly heated to about 90° C. rapid gelling will take place as the alcohol and reaction products of ethyl orthosilicate and aluminum nitrate are driven off.

EXAMPLE 1

An inorganic oxide gel type catalyst was prepared as follows. 20 parts by volume of ethyl orthosilicate, 5 parts by volume of distilled water, 34 parts by volume of ethyl alcohol 95%, and 108 parts by volume of saturated aluminum nitrate solution in water, were mixed together and stirred slowly until a clear, perfect solution was obtained.

The solution was then heated at 90° C. to distill alcohol and reaction products and obtain an alumina-silica gel.

The gel was synerized for 45 minutes at 85° C. in an atmosphere of saturated steam. After syneresis the gel was dried at 110° C. and brought up to 1350° F. in bone dry air for 4 hours.

The final product, an aluminum silicate, was analyzed and found to contain by weight 58% $Al_2O_3$ and 42% $SiO_2$. The apparent density of this gel was .638.

This gel was tested in the cracking of East Texas gas oil at 800° F. for 10 minute on-stream periods at a charging rate of 2.8 volumes of oil per hour per kilogram of catalyst and the yield was 46% by volume of gasoline, 11.15% by weight wet gas, 4.6% by weight of coke, indicating a catalyst of very high activity.

This same gel was then submitted to five successive impregnations with additional quantities of the clear perfect solution originally made, each impregnation being followed by the steps above described for gelling, syneresis and drying. The apparent density of the resulting gel product was .787, but chemical analysis after the five impregnations showed the same aluminum silicon weight ratio as before, namely 58% $Al_2O_3$:42% $SiO_2$. When this impregnated gel was used to crack East Texas gas oil under the identical conditions of time on stream, temperature and rate as for the original gel the yields were 31.6% by volume of gasoline, 4% by weight wet gas, and 1.6% by weight of coke, showing as compared with the original gel a loss of activity measured in per cent gasoline production of 14.4, an average loss of 2.9 points or per cent for each impregnation.

EXAMPLE 2

An inorganic oxide gel catalyst identical with the original gel, or so called final product of Example 1, was prepared, i. e., an aluminum silicate containing by weight 58% $Al_2O_3$ and 42% $SiO_2$, with an apparent density of .638. This gel was immersed in a petroleum ether solution containing 3% by volume of lubricating oil. The gel was drained and the petroleum ether was distilled off the gel to leave the lubricating oil as a protective film on the gel catalyst. This protected gel was then submitted to five successive impregnations of the original solution of Example 1, each impregnation being followed by the steps described in Example 1 for gelling, syneresis and drying as well as by impregnation in the petroleum ether and lubricating oil solution after each drying period. After the fifth impregnation the resulting gel was oxidized in air at 900° F. and the carbon and polymers from the lubricating oil were burned off, the average temperature of the gel being held at 1050° F. The apparent density of this catalyst was .775 and chemical analysis after the five impregnations showed the same alumina-silica ratio of 58% $Al_2O_3$:42% $SiO_2$. When this gel catalyst was used to crack East Texas gas oil under the same conditions as in the previous test, namely temperature of 800° F., 10 minute on stream period at a rate of 2.8 volumes of oil per hour per kilogram of catalyst, the yield was 47.5% by volume of gasoline, 11.5% by weight wet gas, and 4.8% by weight of coke, indicating a slightly greater activity than the original gel catalyst of Example 1.

EXAMPLE 3

A catalyst was desired for a moving bed cracking operation in which attrition of the catalyst is very severe. Consequently it was imperative that the cracking catalyst to be used in association with small stable inert supports or carriers of porcelain which were very strong but had a multiplicity of very minute pores. It was also desired that the catalyst consist of 87.5% $SiO_2$ and 12.5% $Al_2O_3$.

A clear liquid stable solution was prepared from the following: 203 parts by volume of ethyl orthosilicate, 50 parts by volume of distilled water, 254 parts by volume of ethyl alcohol (95%), and 90 parts by volume of saturated aluminum nitrate solution in water, which were mixed together and stirred slowly until a clear perfect solution was obtained. A portion of this solution was heated at 90° C. to distill alcohol and reaction products so as to obtain an alumina-silica gel. This gel was synerized for 45 minutes at 85° C. in an atmosphere of saturated steam. It was then dried at 110° C. and brought up to 1350° F. in bone dry air for 4 hours. The resulting alumina-silica gel was analyzed and found to contain by weight 87.7% $SiO_2$ and 12.3% $Al_2O_3$. It was tested in cracking East Texas gas oil at 800° F. for 10 minutes on stream at a rate of 2.5 volumes of oil per hour per kilogram of gel giving the following yield: 48.4% by volume of gasoline, 14.22% by weight wet gas and 5.5% by weight of coke.

EXAMPLE 4

For the supported catalyst to be used in the high attrition moving bed operation the selected porcelain supports or carriers had a porosity of 38%, pore size .002" to .004", wall thickness of .0375", in the form of hollow cylinders with an outside diameter of .09" and an inside diameter of .015″. These supports or carriers were immersed under vacuum in the clear perfect solution of Example 3 for 15 minutes, then drained and maintained at 90° C. to distill the alcohol and reaction products and cause the solution to gel. The contact mass was then submitted to steam at 80° C. for 45 minutes to synerize the gel. The mass after drying was immersed in petroleum ether containing 3% by volume of lubricating oil. The petroleum ether was distilled off, whereupon the above operation of immersing in the clear perfect solution, gelling, synerizing and applying the protecting coating of lubricating oil was repeated four times, the lubricating oil impregnation being omitted in the last operation. The mass was then heated at 900° F. in air so as to burn off the lubricating oil polymers, the burning temperature being held at about 1150° F. to 1200° F., whereupon the catalyst was ready for use. It was found to contain 114 grams of active catalyst per liter of supports or carriers. The mass was used to crack East Texas gas oil at a charging rate of 12.5 volumes of oil per hour per kilogram of catalyst for on-stream periods of 3.75 minutes, giving yields as follows at the indicated temperatures:

| Temp., ° F. | Gasoline, percent by vol. | Wet Gas, percent by wt. | Coke percent by wt. |
|---|---|---|---|
| 900 | 36.2 | 19.1 | 4.1 |
| 875 | 39.0 | 12.5 | 3.3 |
| 850 | 41.6 | 10.4 | 3.1 |

For purposes of comparison with the straight gel of Example 3, the mass was tested on East Texas gas oil at 800° F. for 10 minutes on stream at a rate of 2.7 volumes of oil per hour per kilogram of catalyst and produced a yield of 47.0% by volume of gasoline, 14.1% by weight wet gas, 6.1% by weight of coke, indicating that it had substantially the same activity as the straight gel.

EXAMPLE 5

The same supports or carriers as in Example 4 were impregnated five times in succession with the clear perfect solution of Example 3, the gelling and synerizing steps being conducted as in Example 4 but the step of dipping in petroleum ether containing lubricating oil was not utilized. After the five impregnations the supports or carriers contained 118 grams of active catalyst per liter. When subjected to the same cracking conditions on East Texas gas oil as in Example 4, namely charging rate of 12.5 volumes of oil per hour per kilogram of catalyst and 3.75 minutes on-stream, the results at the indicated operating temperatures were:

| Temp., ° F. | Gasoline, percent by vol. | Wet Gas, percent by wt. | Coke, percent by wt. |
|---|---|---|---|
| 900 | 35.6 | 7.6 | 2.2 |
| 875 | 34.0 | 7.2 | 2.1 |
| 850 | 32.8 | 6.9 | 1.9 |

The check run at 800° F., rate of 2.7 volumes of oil per hour per kilogram of catalyst and 10 minutes on stream, gave 38.7% by volume of gasoline, 6.9% by weight wet gas, and 3.7% by weight of coke.

Comment on Examples 4 and 5

As is well known, the activity of a cracking catalyst is not only indicated by the yield of gasoline but also by the total conversion, that is, gasoline plus gas plus coke. The distribution of products will be determined to a large extent by selection of operating conditions.

Comparison of the yields obtained in Examples 4 and 5 shows that at higher temperatures and high rates of feed the catalysts manufactured with protective film between successive immersions or impregnations have a total conversion varying from about 12 to about 14 points above the total conversion of the catalysts manufactured without protective film between impregnations.

At lower rates and lower temperatures the total conversion of catalysts made with protective film is of the order of 18 points above the catalysts without protective film.

EXAMPLE 6

For the solutions of ethyl orthosilicate and aluminum nitrate of Examples 1 and 3 there was substituted a solution of sodium silicate and aluminum sulphate brought to a pH of the order of 2.5 to 3.5 by the addition of sulfuric acid. Such a solution does not gel for a long time and is consequently entirely suitable for liquid impregnation. The gel sets naturally by itself or in impregnated porcelain when heated, and can then be synerized, dried, base exchanged and washed to remove the impurities, dried again, and immersed in the lubricating oil-petroleum ether solution to protect the gel against further impregnation.

When this procedure is followed through four times after the manner of Example 4, the results and yields obtained are practically identical with the results and yields in Example 4.

From the above examples it is clearly apparent that the addition of active catalytic material to a preformed or predeposited gel through a subsequent impregnation with a liquid solution of the active material and gelling is detrimental to the total gel obtained regardless of whether the preformed gel is a straight gel or is in association with an inert support or carrier. The addition of more gel to a gel already deposited in and on a support or carrier is obviously made to permit an increase in the charge of reactants to the catalytic mass so as to obtain greater yield, the desire of course being to maintain the same rate of conversion. However, the facts are that such addition performs in the opposite direction, i. e. reduces overall activity of catalyst with consequent proportional loss in yield, whenever the preformed catalyst is not coated with a protective film to prevent direct contact of active material with the subsequent impregnating solution. In the making of high activity cracking catalysts the activity of the catalyst drops regularly after each impregnation when the protecting procedure is not employed, the loss in activity being in the range of one to three points each time, while gas and coke formation diminish accordingly (see Examples 1 and 5). For the purpose of further checking this matter the process of liquid impregnation (without intervening protecting procedure) was carried out to the number of times necessary to build up within a particular porcelain support or carrier a gel in such amount that its density would be equal to the density of the straight gel. Twenty-one impregnations had to be made to obtain this result and the amount of catalyst deposited was 300 grams per liter of porcelain supports or carriers of 40% porosity. The activity index of the built up catalytic material was 25.9 while the activity index of the straight gel itself was 48 under identical test cracking conditions of temperature, time on stream and feed rate of oil per unit of active catalyst.

In the manufacture of plural gel catalysts it must be understood that liquid impregnation of active ingredients may be made in two or more steps (depending on the number of gel components) with separate gelling of each component before the protective film or coating need be added. In other words the protective procedure is required only after the actual active plural gel has been obtained. For instance, a silica-alumina cracking catalyst can be made by impregnating a support or carrier first with a solution of silicon or of aluminum, gelling the silica or alumina, then directly impregnating again in a solution of the other component—aluminum or silicon—and again gelling to obtain the desired silica-alumina catalyst. It is only then that this preformed catalyst is subjected to the protective film operation, after which the above steps of separately impregnating with solutions of silicon and aluminum and separate gellings are repeated to be followed again by the protective procedure, and the steps further repeated to obtain the desired amount of active catalyst on the support without in any manner impairing its activity as a result of the successive impregnations. In a similar manner active cracking catalysts of the plural gel type may be built up with composites of silica, alumina, zirconia, beryllia, etc.

As previously stated, the technique of the present invention has general application to the broad field of catalysis. The following instances are illustrative only. For oxidation a rugged solid contact mass resistant to physical shocks and attrition was required, since the mass was to be vibrated continuously to dislodge metal particles present in the reactant stream. A combination of silver and alumina was selected as the catalytic material. Inert procelain supports of small size and having very minute pores of the order of .001" were impregnated with a solution of silver nitrate and aluminum nitrate, then gelled and dried. Seven successive impregnations were required to deposit sufficient catalytic material to effect the desired oxidation. The gel made at each impregnation was isolated or protected by a film of lube oil from the next impregnation. The amount of active material deposited in the seven impregnations was 155 grams per liter of supports or carriers and the catalyst was of uniformly high activity throughout.

For dehydrogenation a stable catalytic mass was required capable of being maintained within certain limits of temperature during an on stream and regenerating cycle. Porcelain supports or carriers having pores in the size range of about .001" to .004" were selected to be impregnated with a combination of chromic oxide and alumina. A solution of aluminum nitrate and chromic oxide was utilized to impregnate the supports or carriers which were then gelled and dried. Five impregnations were necessary to obtain the required amount of active material on the support. The protective film had to be used to secure a catalyst of full activity.

Similarly highly active stable catalysts for hydrogenation can be made by successive impregnations of inert porous supports in a solution of nickel oxide and aluminum nitrate by utilizing the procedure of the protective film between impregnations. For ammonia synthesis a desirable highly active and stable contact mass is obtained by successive impregnations of strong inert porous supports in a solution of platinum oxide and aluminum nitrate provided the protection procedure is employed between impregnations.

Thus the new technique has wide application in the manufacture of catalysts of all types and for a great variety of catalytic operations. It is especially attractive when operating conditions are most severe and when the catalytic masses are subjected to attrition, impact, thermal shocks, etc. Very strong supports or carriers with minute pores can be utilized since catalysts in liquid solution can enter such pores and the desired or required amount of catalytic material can be built up in the pores by successive impregnations with the assurance that high activity throughout the built up catalyst will be attained by utilizing he protective film procedure between impregnations.

I claim as my invention:

1. In a method for the manufacture of catalysts wherein the quantity of catalytically active material making up the catalyst is built up in a series of deposits produced by successive impregnations with a liquid solution containing said catalytic material, the improvement which comprises applying to said successive deposits, between said successive impregnations, a protective film of an organic material which cannot be displaced or penetrated by said solution during said impregnations, and which is readily removable from said catalyst by oxidation.

2. A method in accordance with claim 1 in which said protective film is composed of a heavy hydrocarbon liquid.

3. In a method for the manufacture of catalysts wherein the quantity of catalytically active material making up the catalyst is built up in a series of deposits produced by successive impregnations with a liquid solution containing said catalytic material, followed by gelling said catalytic solution and drying said gel, the improvement which comprises applying to said successive deposits of dried gel, between said successive impregnations, a protective film of an organic material which cannot be displaced or penetrated by said liquid solution during said impregnations, and which is readily removable from said catalyst by oxidation.

4. In a method for the manufacture of catalysts wherein the quantity of catalytically active material making up the catalyst is built up in a series of deposits produced by successive impregnations with a liquid solution of said catalytic material, and wherein each impregnation is followed by treatment to convert the catalytic material originally in solution into a catalytically active form, the improvement which comprises depositing upon said successive deposits of catalytically active material, between said successive impregnations, a protective film of an organic material which cannot be displaced or penetrated by said liquid solution during the impregnation, and which is readily removable from said catalyst by oxidation.

5. In a method for the manufacture of catalysts wherein an additional deposit of catalytic material of the same composition is added to a previously formed catalyst by impregnation thereof with a liquid solution of said catalytic material, the improvement which comprises applying to said previously formed catalyst a protective film of an organic material which cannot be displaced or penetrated by said liquid solution during the impregnation, and which is readily removable from said catalyst by oxidation.

6. In a method for the manufacture of catalysts wherein the quantity of catalytically active material making up a preformed gel-type catalyst is increased by adding at least one additional deposit of catalytic material of the same composition to said preformed gel by impregnation thereof with a liquid solution of said catalytic material, the improvement which comprises applying to said preformed gel, before impregnation thereof by said liquid solution, a protective film of an organic material which cannot be displaced or penetrated by said solution and which is readily removable from said catalyst by oxidation.

7. In a method for the manufacture of catalysts wherein the quantity of catalytically active material in the pores of a porous stable support is built up in a series of deposits produced by successive impregnations with a liquid solution of said catalytic material, the improvement which comprises applying to said successive deposits, between said successive impregnations, a protective film of an organic material which cannot be displaced or penetrated by said liquid solution during the impregnation, and which is readily removable from said catalyst by oxidation.

8. In a method for the manufacture of inorganic oxide gel-type catalysts wherein the quantity of catalytically active material in the pores of a stable porous support is built up in a series of deposits produced by successive impregnations with a liquid solution containing said inorganic oxide gel-type catalyst, and wherein each impregnation is followed by gelling of the catalyst solution and drying of the gel, the improvement which comprises applying to said successive deposits of dried gel, between said successive impregnations, a protective film of an organic material which cannot be displaced or penetrated by said liquid solution during the impregnation, and which is readily removable by oxidation.

9. A method in accordance with claim 8 in which said inorganic oxide gel-type catalyst is of the silica-alumina type suitable for use in the catalytic conversion of hydrocarbons.

EUGENE J. HOUDRY.

References Cited in the file of this patent

UNITED STATES PATENTS

| Number | Name | Date |
| --- | --- | --- |
| 2,211,208 | Ipatieff et al. | Aug. 13, 1940 |
| 2,507,496 | Bond | May 16, 1950 |

FOREIGN PATENTS

| Number | Country | Date |
| --- | --- | --- |
| 610,080 | Great Britain | Oct. 11, 1948 |